United States Patent
Jones et al.

(10) Patent No.: US 10,862,940 B1
(45) Date of Patent: Dec. 8, 2020

(54) LOW LATENCY LIVE VIDEO ON A COMMUNICATION SESSION

(71) Applicant: Glance Networks, Inc., Arlington, MA (US)

(72) Inventors: Ellis Oliver Jones, Newburyport, MA (US); Richard L. Baker, Belmont, MA (US)

(73) Assignee: Glance Networks, Inc., Wakefield, MA (US)

(*) Notice: Subject to any disclaimer, the term of this patent is extended or adjusted under 35 U.S.C. 154(b) by 0 days.

(21) Appl. No.: 16/528,002

(22) Filed: Jul. 31, 2019

Related U.S. Application Data

(60) Provisional application No. 62/712,552, filed on Jul. 31, 2018.

(51) Int. Cl.
*G06F 15/16* (2006.01)
*H04L 29/06* (2006.01)
*H04L 29/08* (2006.01)

(52) U.S. Cl.
CPC ........ *H04L 65/605* (2013.01); *H04L 65/1059* (2013.01); *H04L 65/4069* (2013.01); *H04L 65/80* (2013.01); *H04L 67/02* (2013.01)

(58) Field of Classification Search
CPC ....... H04L 65/605; H04L 67/02; H04L 65/80; H04L 65/4069; H04L 65/1059
See application file for complete search history.

(56) References Cited

U.S. PATENT DOCUMENTS

| | | | |
|---|---|---|---|
| 9,077,774 B2* | 7/2015 | Pikin | H04N 7/147 |
| 9,350,763 B1* | 5/2016 | McHugh | H04L 65/00 |
| 9,462,089 B1* | 10/2016 | Fallows | H04L 69/14 |
| 2013/0305342 A1* | 11/2013 | Kottilingal | G06F 21/62 726/11 |
| 2014/0044123 A1* | 2/2014 | Lawson | H04L 65/1023 370/352 |
| 2016/0065993 A1* | 3/2016 | Tanizawa | H04N 21/2402 375/240.26 |
| 2016/0234536 A1* | 8/2016 | Stockhammer | H04N 21/85406 |
| 2017/0093939 A1* | 3/2017 | Bar-Mashiah | H04L 65/4069 |
| 2018/0213014 A1* | 7/2018 | Kim | H04L 65/1069 |
| 2019/0028527 A1* | 1/2019 | Smith | H04N 19/154 |
| 2019/0075334 A1* | 3/2019 | Yamagishi | H04N 21/845 |

* cited by examiner

*Primary Examiner* — Aftab N. Khan
*Assistant Examiner* — Anh Nguyen
(74) *Attorney, Agent, or Firm* — Anderson Gorecki LLP

(57) ABSTRACT

A video sender loads sender video processing JavaScript into a browser, the sender video processing JavaScript being configured to receive video from a source connected to the first computer, encode images of the video into a H.26x encoded video format, package the encoded video into WebM or FMP4 format, and output the packaged/encoded video on the communication network. A video receiver loads receiver video JavaScript in its browser, the receiver video JavaScript comprising a video format detector, a WebM deboxer, a FMP4 deboxer, a H.26x video decoder, and a rendering engine. The video format detector determines whether received video is packaged using WebM or FMP4 and sends the video to the respective deboxer. The deboxed video is then decoded using the H.26x decoder and the images are rendered by the rendering engine. Timestamps and byte counts are inserted into the video packages, and acknowledgments are used to determine excess latency.

31 Claims, 8 Drawing Sheets

LOW LATENCY LIVE VIDEO ON A COMMUNICATION SESSION

CROSS REFERENCE TO RELATED APPLICATIONS

This application claims priority to provisional application No. 62/712,552, filed Jul. 31, 2018, the content of which is hereby incorporated herein by reference in its entirety.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for providing low latency live video on a communication session without requiring the computer receiving the video to install any plugins or downloads.

BACKGROUND

Many browsers, used for displaying webpages, have built in capabilities to decode various types of video formats. Some video formats require a user to have an installed application, browser extension, or plugin to display the video. For customer support, where a website visitor is contacting an agent to request help, the agent may want to be able to provide the website visitor with live video in connection with providing assistance to the website visitor.

Unfortunately, commonly used video formats that are able to be decoded natively by commonly used browsers to display video content often exhibit excessive latency, which can decrease the effectiveness of the use of live video for customer support. While there are other video formats that can be used to provide better quality video, typically these formats are not universally able to be decoded by all of the commonly used browsers. For example, some video formats are only able to be decoded by particular types of browsers and other video formats require an application, browser extension, or plugin to be installed in a browser to enable the video to play in the browser.

In a customer support context, where a website visitor is seeking help from a customer support agent, requiring the customer to switch browsers or install an application, browser extension, or plugin in connection with receiving customer support is untenable. Alternatively, having the customer support agent go through the process of ascertaining the type of browser in use by the visitor and determining the capabilities of the visitor browser to select the correct video format is likewise untenable. Since the customers cannot be assumed to have the necessary software installed on their system, using video technology that is not universally supported by commonly used browsers doesn't provide a satisfactory solution for enabling use of video in connection with customer support.

Additionally, common video streaming techniques often experience significant latency issues which makes the use of commonly available video streaming unworkable in a customer support context. Specifically, where a person is engaged with a customer support person and is actively talking to the person over a phone call, having a live (video) view of the person somewhat out of synch with the transmitted audio is disconcerting and distracting. Thus, where the latency associated with transmission of video causes the video to lag a concurrent independently transmitted audio, it would be preferable to reduce the latency of the transmitted video to reduce the amount of lag between the independently transmitted audio and video.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

This disclosure is based, in part, on the realization that it would be desirable to provide high quality, low latency, live video, using existing browser technology, that enables a computer to display the live video using existing browser technology, without requiring the computer that receives the video to have previously installed any additional application, browser extension, or browser plugin.

In some embodiments, a video sender loads sender video processing JavaScript into a browser, the sender video processing JavaScript being configured to receive video from a source connected to the first computer, encode images of the video into a H.26x encoded video format, package the encoded video into WebM or FMP4 format, and output the packaged/encoded video on the communication network. A video receiver loads receiver video JavaScript in its browser, the receiver video JavaScript comprising a video format detector, a WebM deboxer, a FMP4 deboxer, a H.26x video decoder, and a rendering engine. The video format detector determines whether received video is packaged using WebM or FMP4 and sends the video to the respective deboxer. The deboxed video is then decoded using the H.26x decoder and the images are rendered by the rendering engine. Timestamps and byte counts are inserted into the video packages, and acknowledgments are used to determine excess latency.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
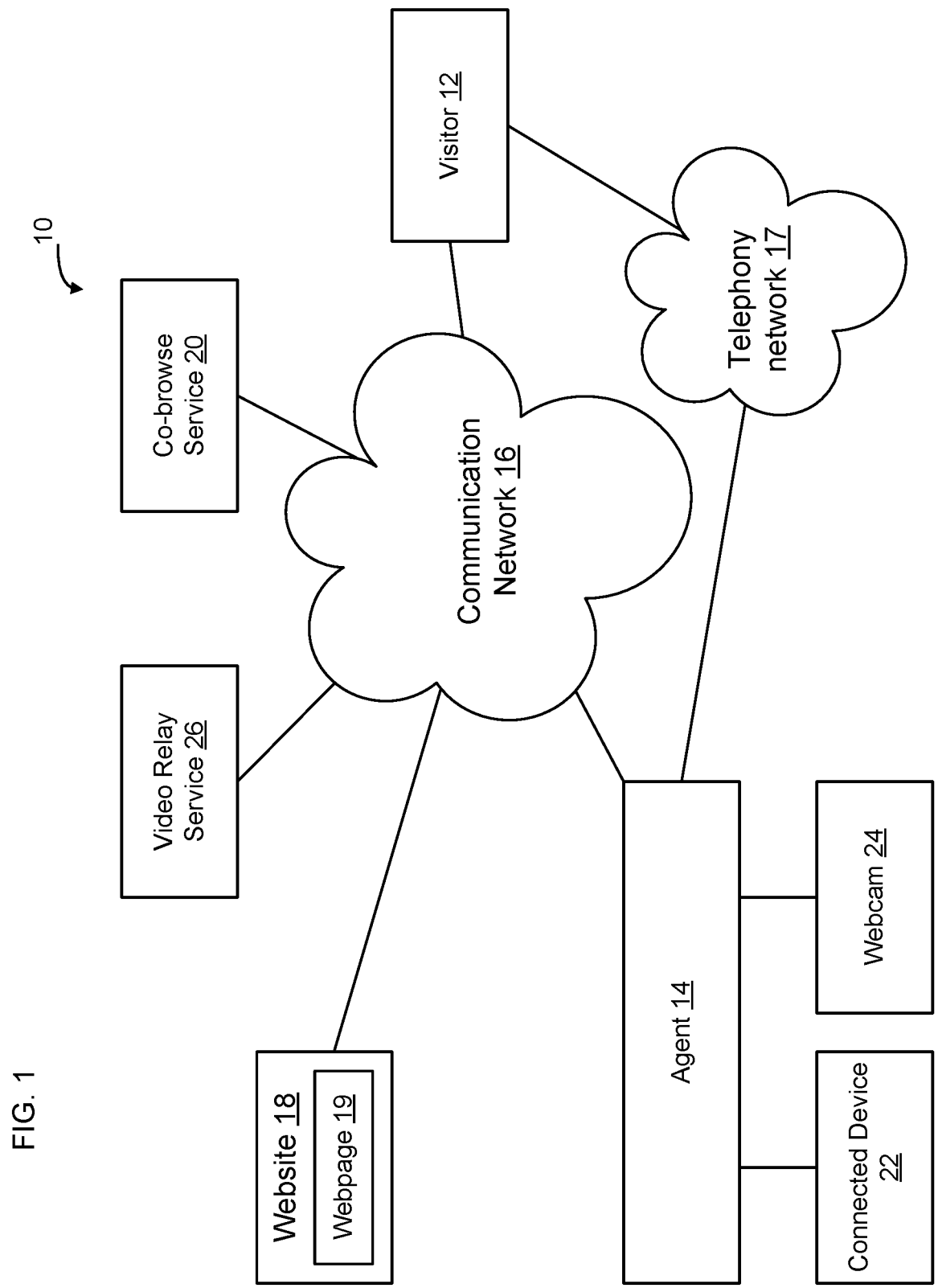
FIGS. 1 and 2 are functional block diagrams of example sets of networked components for enabling low latency live video on a communication session, according to some embodiments.

FIG. 1 is a functional block diagram of an example set of networked components 10 for enabling low latency live video on a communication session 27, according to some embodiments of the present disclosure. As shown in FIG. 1, in some embodiments a person using visitor computer 12 and a person using agent computer 14 or an AI bot associated with agent computer 14 are communicating on communication network 16 or on a phone call implemented on telephony network 17. For example, visitor 12 may be browsing website 18 and have loaded webpage 19, and contact agent 14 for help. For example, the visitor 12 may place a telephone call 29 to the agent 14 to obtain customer assistance with the website 18 or webpage 19. The phone call may be placed on the telephony network 17 or may be implemented as a Voice over Internet Protocol (VoIP) call or other type of telephone call on communication network 16.

As used herein, the term "visitor" will be used to refer to the person browsing the website 18 and the term "agent" will be used to refer to the person at call center that picks up the call from the customer or that assumes responsibility for a text-based dialog with the customer. Where the agent is a live person, the live agent may be working at a call center or may be an independent person affiliated with the call center. In some embodiments, the "live agent" may initially be an automated response mechanism, such as an Artificial Intelligent (AI) bot to provide computer generated customer support. In some embodiments, the agent may initially be an automated response mechanism, and may change to a live person during the course of the interaction with the visitor 12. The terms "visitor" and "agent" will also be used herein to refer to the respective computing devices in use by each of the participants to a communication session 27 between the customer and agent. Thus, for example, the term "visitor" may refer to the live person operating the computing device or to the computing device being used by the live person to execute the application depending on the context. Likewise, the term "agent" may refer to the live person or AI bot at the call center, or to the computing device being used by the live person at the call center, depending on the context. Where the context indicates that computer generated messages are being passed between various computer components shown in FIG. 1, the respective terms "visitor" and "agent" are being used to refer to the computing devices in use by the respective live persons, or between the computing device in use by the visitor person and the AI bot.

As used herein, the term "computer" is used generically to encompass any device having the capability of connecting to the Internet. Thus, the term "computer" as used herein includes laptop computers, desktop computers, tablet computers, smartphones, and other electronic devices.

Figure 2:
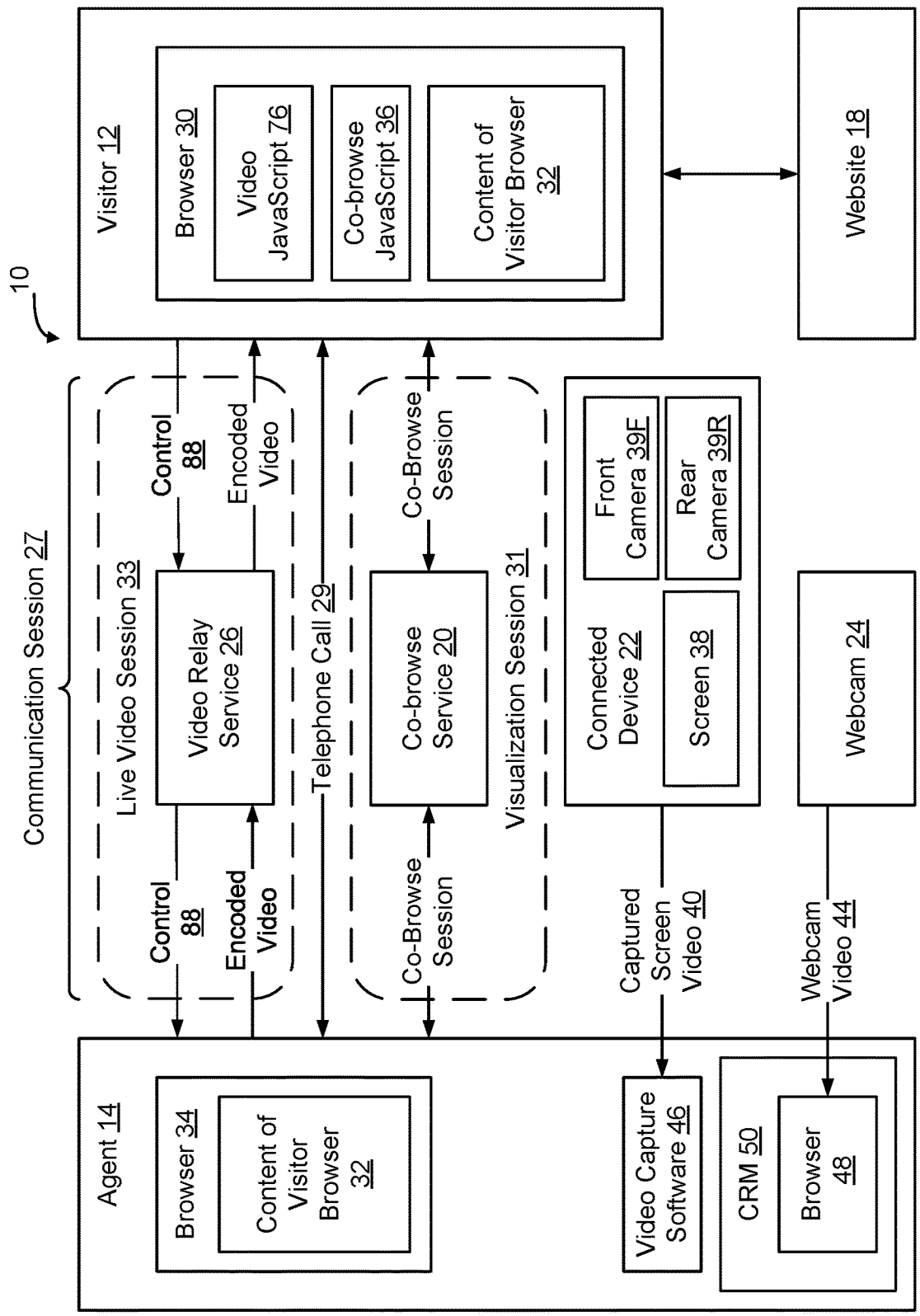

FIG. 2 shows several components of the set of networked components 10 of FIG. 1 in greater detail. As shown in FIG. 2, in some embodiments, a communication session 27 between a visitor 12 and an agent 14 includes a voice-based telephone call 29, a text-based exchange of messages, or other interactive exchange of information between the agent and visitor. In addition, the communication session 27 may include a visualization session 31, for example which may be implemented using co-browse technology. Although an implementation will be described in which the visualization session 31 is implemented using co-browse technology in which the agent is able to see the content of the visitor's browser 30, in some embodiments other forms of visualization technologies may be utilized such as screen share technology. As discussed in greater detail herein, in some embodiments the communication session 27 also includes the transmission of live video on live video session 33

In some implementations the visitor computer 12 has a visitor browser 30 that has loaded a webpage 19 from website 18. In some embodiments, when visitor browser 30 loads the webpage 19 from website 18, co-browse JavaScript 36 is downloaded into visitor browser 30. Co-browse JavaScript 36 copies the DOM of the visitor browser 30 and transmits the DOM of the visitor browser 30 to co-browse service 20. The co-browse service 20 forwards the co-browse information (i.e. DOM) to the agent browser 34, enabling the agent browser 34 to recreate the content 32 of visitor browser 30. Additional information about co-browse sessions is contained in U.S. Pat. No. 9,736,213, entitled Integrating Co-Browsing with Other Forms of Information Sharing, the content of which is hereby incorporated herein by reference.

In some embodiments, while the agent 14 is engaged with the visitor 12 on the telephone call 29 and/or visualization session 31, the agent 14 may elect to show live video back to the visitor 12. For example, in some embodiments the agent 14 will have a connected device 22 and elect to show the content of the screen 38 of the connected device 22 to the visitor 12. In some embodiments the agent 14 will have a webcam 24 and will elect to show the visitor the content of what is being captured by the webcam 24. For example, the webcam 24 may be used to enable the visitor 12 to have a live view of the agent 14 while the agent and customer are interacting with each other on the telephone call 29. Other sources of live video may be used as well, such as a screen capture of information shown on the agent's display.

In these and other instances it would be advantageous to enable the agent 14 to provide low latency live video back to the visitor 12 in connection with continuing to engage with the visitor on the telephone call 29 and/or visualization session 31. Accordingly, as shown in FIG. 1, in some embodiments a video relay service 26 is provided on the communication network 16 to facilitate transmission of low latency live video from the agent 14 to the visitor 12. Although an embodiment will be described in which video is being transmitted from the agent to the visitor, the video relay service 26 may be used to transmit video between any two or more properly configured computers and thus is not confined to only transmitting video from the agent to the visitor. In some embodiments, for example, the video relay service 26 is also configured to transmit low latency live video from the visitor 12 to the agent 14. Particularly if the visitor is running a browser that natively supports generation of video described herein, such as if the visitor is using a browser (such as a Chrome browser) capable of generating WebM video, video processing JavaScript 58 downloaded to the visitor's browser in connection with loading webpage 19 may be used to generate and transmit video from the visitor 12 to the agent 14. In some embodiments, video relay service 26 may be used to transmit the same video stream to more than one visitor 12. For example, agent 14 may be instructing a small group of visitors on how to use connected device 22, in which case all visitors receive the same video stream of the screen of connected device 22. In another example, agent 14 may be instructing a small group of visitors on how to navigate website 18, and all visitors receive the same video of agent 14 from webcam 24.

In some embodiments, when live video is being transmitted from the agent 14 to the visitor 12, the video will appear in the visitor browser 30. The video may appear within the same browser tab, in a separate tab, in a separate browser window, or otherwise on the visitor's display.

There are instances where the content that the agent 14 would like to provide to the visitor 12 is an audio/visual work that includes both a video component and an associated audio component. As used herein, the term "video" refers solely to the video component. If the audio portion of the audio/visual work is to be provided from the agent to the visitor, the audio component may be transmitted on the telephone call 29 or on a separately signaled audio channel.

The agent 14 may have multiple sources of video to be provided to the visitor 12. For example, a connected device 22 may be selected as a source of live video to be transmitted to visitor computer 12. In this example, the images that appear on the screen 38 of the connected device 22 are captured and transmitted to the agent computer 14, for example on a USB tether or over a wireless connection as captured screen video 40. In some embodiments, the connected device 22 is a smartphone, another computer, or a video capture device interfacing to television cameras, recorders, effects generators, or other equipment.

In some embodiments, connected device 22 displays the output of one of device 22's integrated cameras on its screen 38. For example, in some embodiments the output of the front camera 39F of device 22 is shown on screen 38 of device 22. In some embodiments, the output of the rear camera 39R of device 22 is shown on screen 38 of device 22. Regardless of the content that is shown on screen 38, the content of the screen 38 is captured and sent to visitor 12 as discussed in greater detail below. By displaying the output of front camera 39F and/or rear camera 39R on screen 38, and capturing that video, it is possible to capture and provide a live view of the agent manipulating products to one or to several visitors 12 without requiring the agent to have a webcam 24.

As another example, the source of live video may be a webcam 24 that captures, for example, a live view of the person that is using agent computer 14 to provide support to the person using the visitor computer 12. Providing a live view of the agent person to the visitor person enables the visitor person to see who is providing the support, and helps to provide additional human interaction in connection with the communication session 27. Webcam video 44 may be provided to the agent computer 14 on a USB tether or over a wireless connection.

In some embodiments, as discussed in greater detail below in connection with FIG. 4, captured screen video 40 is processed by video capture software 46 to provide low latency live video to the visitor 12 on the live video session 33.

In some embodiments, webcam video 44 is processed by a browser 48, which may be the same as or different than browser 34, to provide low latency live video to the visitor 12 on the live video session 33.

Figure 3:
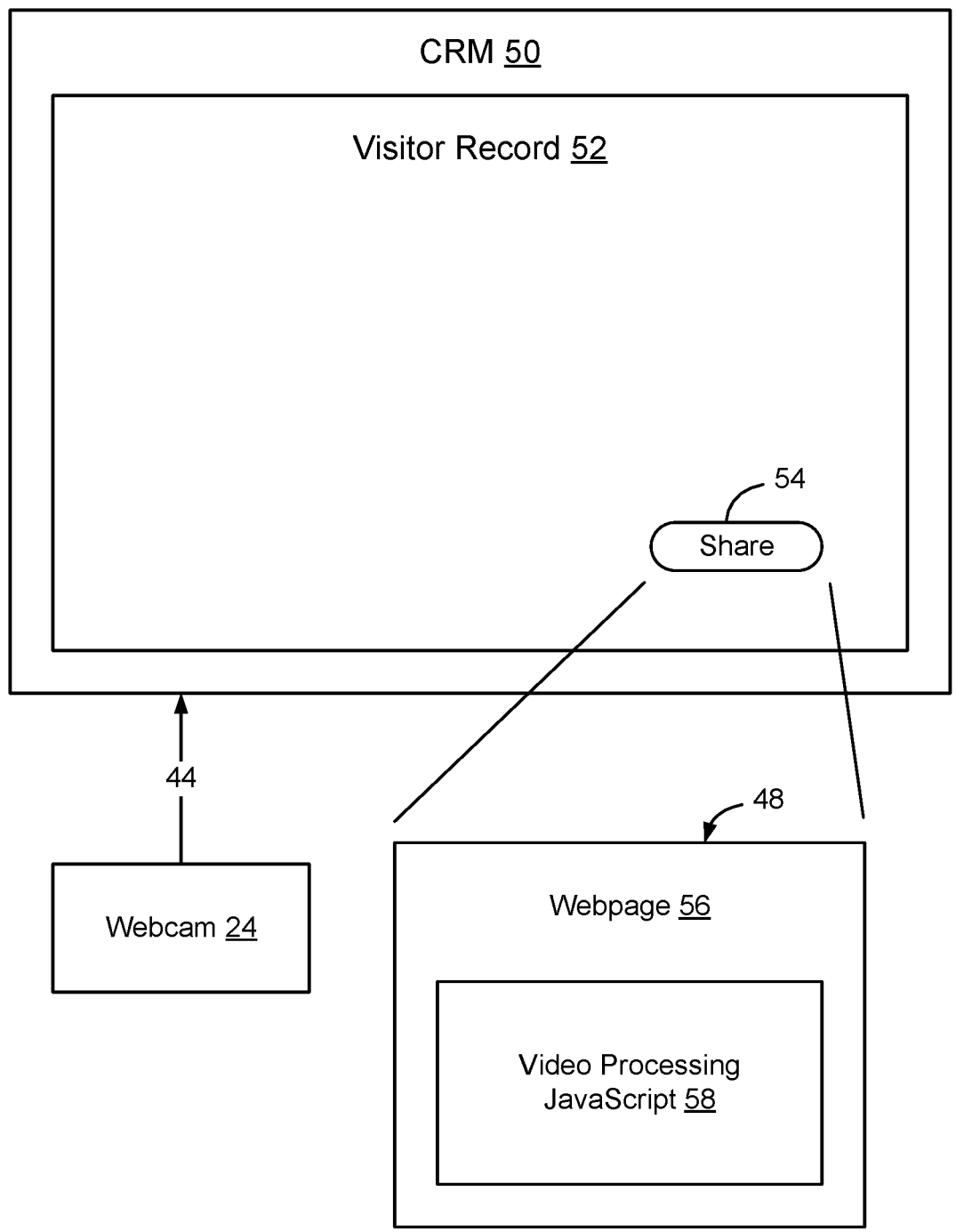
FIG. 3 is a functional block diagram of an agent CRM system, according to some embodiments.

As shown in FIG. 3, in some embodiments the agent 14 is running a Customer Relationship Management (CRM) system 50. When the agent takes the telephone call 29 from the visitor 12, the CRM system 50 pulls the visitor's record 52 so that the agent has background information about the visitor 12 and so that the current interaction between the agent 14 and visitor 12 can be captured in the CRM system 50.

As shown in FIG. 3, in some embodiments browser 48 may be embedded into the CRM system 50 user interface, such as in a feature of the visitor record 52. For example, as shown in FIG. 3, the visitor record 52 may include a button 54 or another feature that is implemented as an embedded browser 48. The browser 48 displays a webpage 56 having the appearance of a button 54, for example in FIG. 3 the button 54 is illustrated as appearing as a race-track shaped button 54 that contains the word "Share". In some embodiments, the webpage 56 is loaded from co-browse service 20. The content of the browser 48, in addition to displaying the content of the webpage 56, in some embodiments also includes video processing JavaScript 58 that enables the browser 48 to process webcam video 44 to provide low latency video on the live video session 33. Video processing JavaScript 58 may be loaded to browser 48 from video relay service 26, co-browse service 20, or from another source, such as from the CRM system 50. Additional details of how the webcam video 44 is processed by browser 48 is provided below in connection with FIG. 4.

As shown in FIG. 3, implementing the button 54 of the CRM system 50 user interface as a webpage 56 enables video processing JavaScript 58 to be injected into the webpage 56 that is displayed in the embedded browser of the visitor record 52 generated by the CRM system 50. When the agent touches or clicks on the button 54, interaction with the webpage 56 implementing the button 54 launches the video processing JavaScript 58. Video processing JavaScript 58 that was downloaded with the webpage 56 initiates acquisition of webcam video 44 from webcam 24, and the video processing JavaScript 58 encodes and forwards the webcam video 44 to visitor computer 12 over communication network 16. Notably, no software other than a freely available web browser is required to be installed to the agent's system to enable the CRM system 50 to provide webcam video 44 to the visitor 12 to allow the visitor to see the agent who is providing the visitor with customer support. Although FIG. 3 shows an example user interface of a CRM system 50 that incorporates an embedded browser, other applications may similarly be provided with an embedded browser to enable a user of the application to share video as described in greater detail here. Accordingly, the invention is not limited to a CRM user interface incorporating an embedded browser configured to load video processing JavaScript but rather any application user interface with an embedded browser may be used to implement the low latency video described herein.

Figure 4:
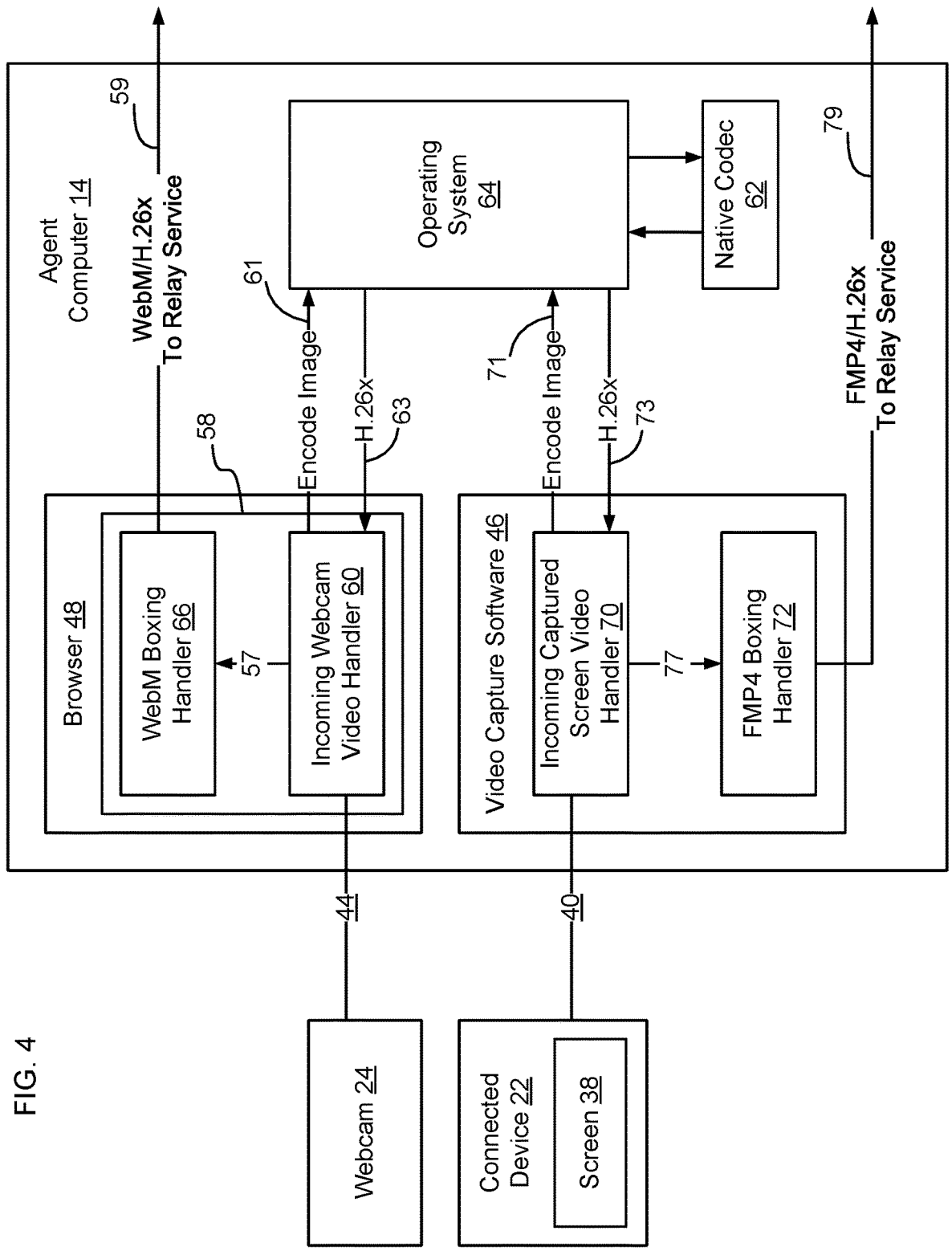
FIGS. 4-6 are functional block diagrams of aspects of an agent computer, according to some embodiments.

FIG. 4 shows the agent computer 14 in greater detail. As shown in FIG. 4, in some embodiments the agent computer 14 uses browser 48 to encode and transmit webcam video 44, and uses video capture software 46 to encode and transmit captured screen video 40, for example from a connected device 22. Example connected devices may include, for example, devices using iOS as an operating system, such as iPhone, iPad, iMac and other devices from Apple Corporation™.

In some embodiments, browser 48 is a modern browser based on, for example, the technology of Webkit, Chromium, or Safari. In some embodiments, the browser 48 is configured to natively encapsulate video for transmission on the communication network using Matroska video envelopes. One example of a browser that uses Matroska video envelopes is configured to output video using WebM video envelopes. As used herein, the term "WebM" will be used to refer to an envelope format that is based on Matroska video envelopes.

In some embodiments, the browser 48 includes an incoming webcam video handler 60 that receives the webcam video 44 and calls on a native codec 62 on the agent computer 14 to encode the webcam video 44 into a video compression standard, such as H.26x (H.265, H.264, H.263, H.261, or a future version of the H.26x standard, VP8 or VP9 format). Other video compression algorithms may be used as well. For brevity, an embodiment will be described in which the video from the webcam 24 is encoded using the H.264 video compression standard. As shown in FIG. 4, in some embodiments the incoming webcam video handler 60 passes data 61 to and calls native codec 62 via Operating System (OS) 64, to enable the native codec 62 of agent computer 14 to perform the H.264 video compression processing. Since native codec 62 often will implement encoding using hardware, the encoding process is extremely fast.

In some embodiments, encoded video 63 that is returned from native codec 62 is received by incoming webcam video handler 60 and passed to a WebM boxing handler 66, also included in browser 48, that packages the H.264 encoded video into WebM format for transmission as WebM/H.264 data 59 on the communication network 16. In some embodiments, the incoming webcam video handler 60 saves compressed video (from native codec 62) in memory until a fixed amount of video has been received, and then transfers (arrow 57) the video to the WebM boxing handler 66 for to be packaged for transmission on the communication network 16. In other embodiments, incoming webcam video handler 60 transfers (arrow 57) video received from native codec 62 to the boxing handler 66 as soon as it becomes available.

Figure 5:
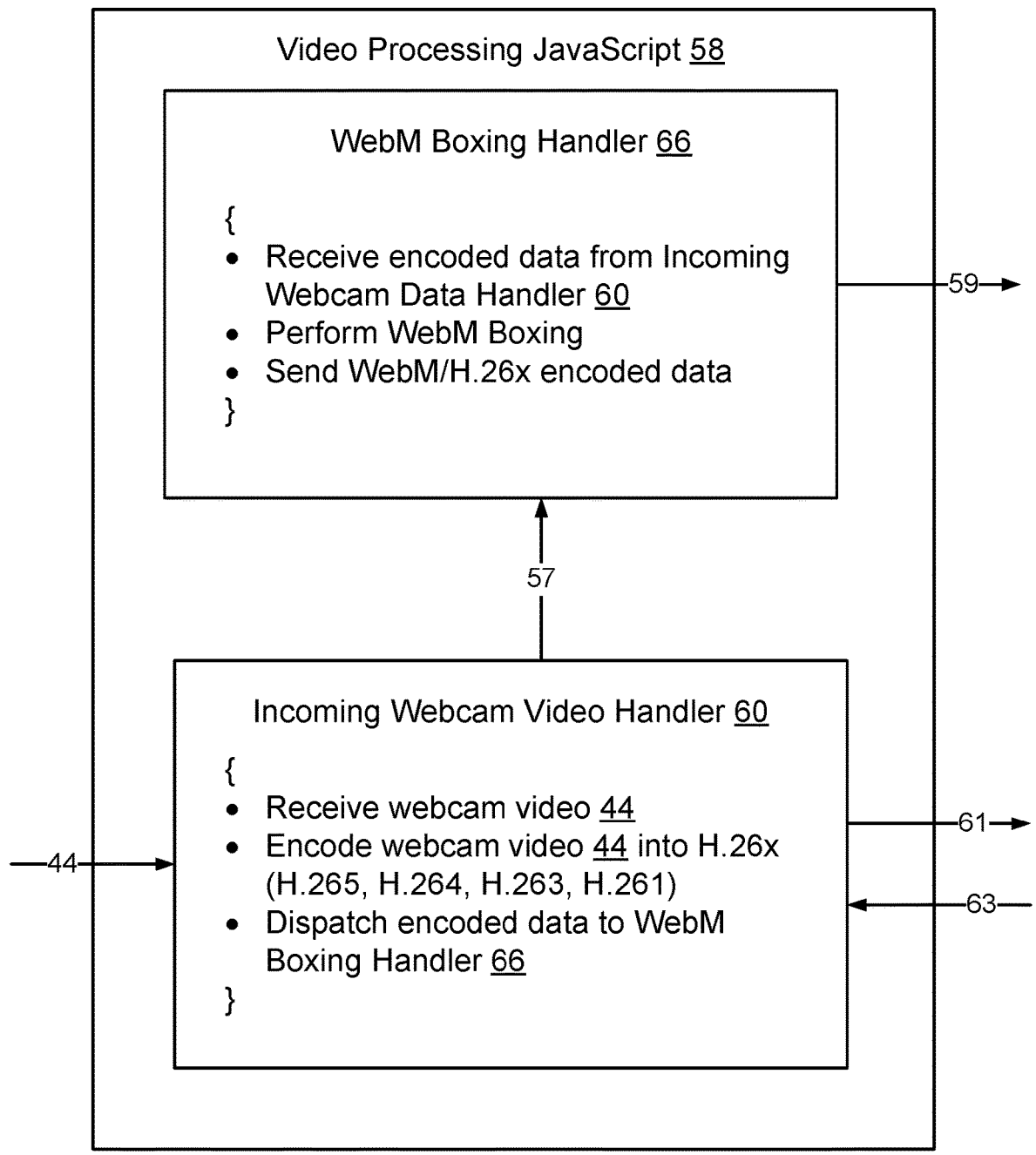

In some embodiments the incoming webcam video handler 60 and WebM boxing handler 66 are coordinated and controlled by video processing JavaScript 58 loaded to the browser 48. FIG. 5 shows an example implementation in which the video processing JavaScript 58 coordinates and controls the incoming webcam video handler 60 and WebM boxing handler 66 using asynchronous programming handlers that independently receive and forward data. As shown in FIG. 5, incoming webcam video handler 60 receives webcam video 44, encodes the video data into H.26x format (arrows 61, 63), and dispatches the encoded data (arrow 57) to the WebM boxing handler 66. The WebM boxing handler 66, receives encoded data from the incoming webcam video handler 60, performs WebM boxing, and sends (arrow 59) the packaged and encoded data to be packetized and forwarded on the communication network 16.

In some embodiments, the WebM boxing handler 66 is controlled by the video processing JavaScript 58 to package video data into WebM containers that are as small in size as possible, to reduce latency associated with forwarding the webcam video to the video relay service 26. For example, in some embodiments the WebM boxing handler 66 is controlled to package encoded webcam video 44 into WebM containers that fit within the payload of a single packet on the communication network 16. In some embodiments, for example when the communication network 16 includes a data link layer like Ethernet, the Maximum Transmission Unit (MTU) of a packet is approximately 1500 bytes. To avoid network delay that can be caused by a message that exceeds the MTU size, the WebM boxing handler 66 attempts to always encapsulate video into WebM containers smaller than 1500-bytes. In other embodiments, the WebM boxing handler 66 packages the encoded webcam video 44 into WebM containers that require two, three, or some other small number of packets to transmit on the communication network 16.

By using a first handler 60 to encode the incoming webcam video 44 into the selected video compression format (H.26x) and using a second handler 66 to package the data into small WebM containers for forwarding on the communication network 16, it is possible to reduce the latency associated with receiving and forwarding data by the agent computer 14. Specifically, by coordinating and controlling the WebM boxing handler 66 to reduce the size of the WebM containers to be as small as possible, the agent computer 14 does not need to buffer incoming webcam video 44 but rather can initiate transmission of the webcam video 44 directly after the webcam 24 is started. Reducing latency of initiation of transmission of the webcam video 44 by the agent computer 14 enables the visitor to see the agent sooner during the live video session 33 and also allows the webcam video 44 to be received by the visitor closer in real time than would otherwise be possible, thus reducing lag between concurrent independently transmitted audio and video and providing an enhanced visual user experience when the visitor is interacting with the agent on the communication session 27.

Specifically, by causing the computer to operate differently in how the computer handles incoming webcam video 44, the overall end-to-end latency of how video is encoded and output from the computer decreases, to thereby improve synchronization between the concurrent independently transmitted webcam video 44 and audio. For example, if an agent and a visitor are talking on telephone call 29, and a webcam 24 is then started to show a live view of the agent on a separate independent live video session 33, if the webcam video 44 is delayed by one or two seconds by the agent computer, or even by half a second, the visitor's view of the agent will appear to be one or two seconds behind the audio received by the visitor. Having the visitor's view of the agent's lips be out of synch with the words heard by the visitor on the concurrent independently transmitted audio (e.g., sent by telephone) can be very distracting. By decreasing the latency within the agent computer, it is possible to provide the webcam video 44 to the visitor computer 12 in a manner that reduces the lag between the concurrent independently transmitted audio and video on the communication session 27 to improve the visual experience at the visitor computer 12. Likewise, at the visitor computer 12, since the WebM packages are small and individually decodable, it is possible for the visitor computer 12 to quickly start displaying the webcam video 44 without requiring the visitor computer 12 to buffer a sufficient quantity of data before starting to play the video. At the video relay service 26, smaller packets mean less latency for the process of receiving those packets from the agent computer 14 and then relaying those packets to the visitor computer 12.

As shown in FIG. 4, in some embodiments the agent computer 14 uses video capture software 46 to process live captured screen video 40. In some embodiments, the video capture software 46 is downloaded from the co-browse service 20 or from the video relay service 26 (see FIG. 1).

Live captured screen video 40 output from connected device 22, in some embodiments, includes information currently shown on a screen 38 of the connected device 22. In other implementations the live video is a video represented in the native format of device 22. In still other implementations the live video is generated by interaction of the agent with the connected device 22, such as if the agent touches a touch sensitive screen 38 of the connected device 22. In some embodiments, connected device 22 generates a video to be transmitted and relays the video via a USB tether to agent 14. The video passing along the USB tether is represented in the native coded format of device 22 or some other suitable coded format.

In some embodiments, the video capture software 46 includes an incoming captured screen video handler 70 that receives the live captured screen video 40 and uses the native codec 62 of the agent's computer to encode the live captured screen video 40 into H.264 video compression or another video compression format, such as H.265, H.263, or H.261 format. Other video compression algorithms may be used as well. For brevity, an embodiment will be described in which the webcam video 44 from the webcam 24 is encoded using the H.264 video compression standard. As shown in FIG. 4, in some embodiments the incoming captured screen video handler 70 passes data 71 to and calls native codec 62 via Operating System (OS) 64, to enable the native codec 62 of agent computer 14 to perform the H.264 encoding. Since native codec 62 often will implement encoding using hardware, the encoding process is extremely fast.

H.264, also referred to as Advanced Video Coding (AVC) works by processing frames of video using a block-oriented, motion-compensation-based video compression standard. Those units are called macroblocks. Macroblocks typically consist of 16×16 pixel samples, that can be subdivided into transform blocks, and may be further subdivided into what are known as prediction blocks. H.265, also referred to as High Efficiency Video Coding (HEVC), processes information in what's called Coding Tree Units (CTUs) as large as 64×64. H.265 includes many other improvements over H.264, which enable it to achieve visual quality comparable to H.264 at 25% to 50% lower bit rate. Additionally, both H.264 and H.265 include Scalable Video Coding (SVC) profiles, which standardize ways to encode video with one or more subset bitstreams having lower quality, such as a lower frame rate, lower resolution, or lower encoded quality. One of the goals of the SVC profiles is to allow a video relay service 26 with more than one connected visitor 12 to send a lower quality subset bit stream to those visitors 12 which cannot reliably render the agent 14's higher quality bit stream. Meanwhile, higher performing visitors 12 would receive and render the agent 14's higher quality bitstream. The relay service 26 in some embodiments parses the SVC bitstream into low and high-quality bitstreams, which requires far fewer computing resources (and incurs less latency latency) than decoding and re-encoding a non-SVC the video stream into additional bitstreams at a lower quality level.

In some embodiments, encoded video 73 that is returned from native codec 62 is received by incoming captured screen video handler 70 and stored in a buffer until the incoming captured screen video handler 70 has a chunk of data for transmission on the communication network 16. Once a predetermined quantity of data has been received, the block of data is passed (arrow 77) to a FMP4 boxing handler 72 that packages the H.264 encoded video into fragmented MP4 format for transmission as FMP4/H.264 data 79 on a network. In other embodiments, encoded data is passed directly to the FMP4 boxing handler 72, without being buffered by incoming captured screen video handler 70, to be packaged by the FMP4 boxing handler 72 for transmission as FMP4/H.264 data 79 on the communication network 16.

Most modern mass-market computer browsers enable MP4 videos containing H.264 encoded video content to be displayed using native or JavaScript-based video decoders. Thus, transmission of video in this format to visitor browser 30 is generally able to be displayed in visitor browser 30 without requiring additional software to be downloaded to visitor computer 12.

Unfortunately, the MP4 standard for playing stored video programs uses an object-oriented format that provides a container for a single large movie data (mdat) box. Forwarding live video using the MP4 format can cause excessive latency, since the large file will need to be transmitted to the visitor computer 12 and sufficient data will need to be received at the visitor computer 12 before the visitor browser 30 is able to start decoding and playing the content of the MP4 file. Further, adjusting the bitrate and resolution of the video encoded within the MP4 file is not straightforward, so that it is difficult to optimize the MP4 file to reduce or minimize latency.

Applicant found that it was possible to overcome some of the inherent difficulties associated with the use of MP4/H.264 encoded video by packaging the MP4 video as fragmented MP4 (FMP4) video. Fragmented MP4 breaks the single large mdat box of standard MP4 video into numerous smaller movie data (mdat) boxes. Each of these smaller movie data boxes contains a segment of the larger movie data box of the MP4 file. In some implementations, the segments are created at regular intervals, allowing the segments to have temporal alignment across files of different bitrates, frame rate, or resolution, which means that it is possible to adapt the bitrate, frame rate, or resolution of the H.264 video 79 transmitted from the agent computer 14 to the visitor computer 12 to accommodate network fluctuations and to accommodate fluctuations in the amount of bandwidth or CPU required to encode the video itself and to decode and render the received video at the visitor 12, without introducing noticeable latency.

By using fragmented MP4 to forward video to the visitor computer 12, applicant found that it is possible to dramatically reduce latency in connection with transmission of live video from a connected device 22, so that the visitor computer 12 is able to receive and display the live video in real time. Since virtually all commercially available browsers are able to display MP4/H.264 encoded video, visitor browser 30 is able to receive and decode the H.264 video contained in the fragmented MP4 video without requiring installation of any special application software, browser extension, or browser plugin. Since fragmented MP4 can be used to encapsulate a video stream that dynamically adjusts its bitrate, frame rate, and resolution, control software 86 can adjust these or other codec parameters with the goal of minimizing end-to-end latency, while accommodating varying network 16 bandwidth and jitter, as well as varying agent 14 CPU and visitor 12 CPU resources.

Figure 6:
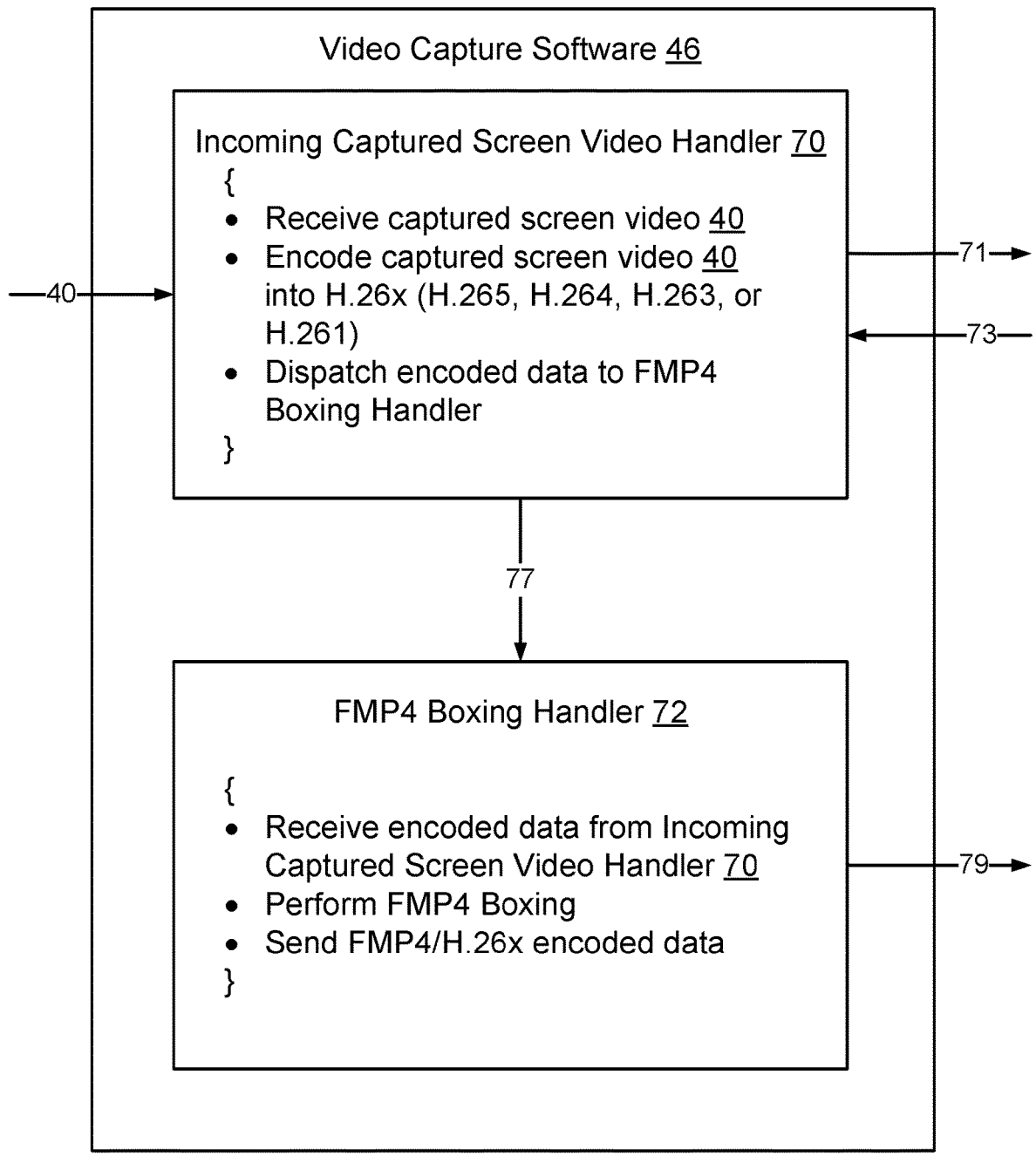

FIG. 6 shows an example implementation in which the video capture software 46 implements the incoming captured screen video handler 70 and FMP4 boxing handler 72 using asynchronous programming handlers that independently receive and forward data. As shown in FIG. 6, incoming captured screen video handler 70 receives captured screen video 40 from a connected device 22, calls native codec 62 (arrows 71 and 73) to encode the video data into H.264 format, and, when sufficient encoded data has been returned from native codec 62, dispatches (arrow 77) the encoded data to the FMP4 boxing handler 72. In some embodiments, data is not buffered at incoming captured screen video handler 70 but is directly passed (arrow 77) to FMP4 boxing handler 72 as it is received from native codec 62. The FMP4 boxing handler 72, receives (arrow 77) encoded data from the incoming captured screen video handler 70, performs FMP4 boxing, and sends (arrow 79)

the FMP4/H.264 packaged and encoded data to be packetized and forwarded on the communication network 16.

By using a first handler 70 to encode the incoming captured screen video 40 into the selected video compression format (H.264, H.263, H.261) and using a second handler 72 to package the data into fragmented MP4 containers for forwarding on the communication network 16, it is possible to reduce the latency associated with receiving and forwarding MP4 format video by the agent computer 14. Specifically, by using FMP4, the agent computer 14 does not need to buffer incoming captured screen video 40 but rather can initiate transmission of the captured screen video 40 directly after transmission of the video has started. Reducing latency of initiation of transmission of the captured screen video 40 by the agent computer 14 enables the visitor to see the screen 38 of the connected device 22 sooner during the live video session 33 and also allows the captured screen video 40 to be received by the visitor computer 12 closer in real time than would otherwise be possible, thus providing an enhanced visual user experience when the visitor is interacting with the agent on the communication session 27.

Specifically, by causing the computer 14 to operate differently in how the computer 14 handles incoming captured screen video 40, the overall end-to-end latency of how that video is encoded and output from the computer 14 decreases, to thereby improve synchronization between the transmitted captured video and a concurrent independently transmitted related audio associated with telephone call 29. For example, if an agent and a visitor are talking by telephone on telephone call 29, and the agent begins to interact with a connected device 22, the agent may be taking actions on the connected device 22 and talking to the visitor about what the agent is doing. If the visitor's view of the connected device 22 is delayed by the agent computer 14 by several seconds, it may be difficult for the visitor to understand the interrelationship between the agent's action and the associated response of the connected device 22. Having the visitor's view of the captured screen video 40 be out of synch with the words heard by the visitor on the concurrent independently transmitted audio on telephone call 29 can therefore be very confusing. Similarly, in an embodiment where the front camera 39F of connected device 22 is being used to display on screen 38 a live view of agent 14, while agent 14 and visitor 12 converse via telephone call 29, processing the captured screen video as described herein enables the latency of the video provided on live video session 33 to be very low, which enables the video of the agent's lips to sync with the audio when the video is displayed to the visitor 12.

By decreasing the latency within the agent computer 14 in connection with processing and forwarding of captured screen video 40, it is possible to provide the captured screen video 40 to the visitor computer 12 in a manner that significantly reduces the lag between the concurrent independently transmitted audio and video on the communication session 27, to improve the visual experience for the visitor as the visitor views the video 40 at the visitor computer 12. At the video relay service 26, smaller packets mean less latency for the process of receiving those packets from the agent computer 14 and then relaying those packets to the visitor computer 12, which means that the use of FMP4 likewise positively impacts the performance of the video relay service 26 as well.

In some embodiments, an agent may elect to provide multiple live video feeds to the visitor 12 during a given communication session 27. The multiple live video feeds may be implemented sequentially or concurrently. For example, an agent 14 may start a first live video feed from webcam 24 to show the visitor a live view of the agent, and then may select one or more additional live video feeds from one or more connected devices 22 to also show to the visitor concurrently with the webcam video 44. Accordingly, although individual video feeds have been described for clarity, it should be realized that multiple concurrent feeds may be output from the agent 14 to the video relay service 26 and provided to the visitor 12.

Similarly, an agent 14 may be helping multiple visitors concurrently. For example, where the agent is conducting training, onboarding, or otherwise leading a conference call with multiple visitors 12, the agent computer 14 may provide a video feed from the webcam 24 to each of the visitors 12 by forwarding the webcam video 44 to the video relay service 26 and having the video relay service 26 multicast the webcam video 44 to each of the visitors 12 the agent is currently helping. This enables each visitor 12 to receive a live webcam 24 view of the person using the agent computer 14 without requiring the agent computer 14 to transmit multiple copies of the webcam video 44.

The agent 14 may also select a video feed from the connected device 22 to be sent to the group of visitors 12. In this situation, the video feed from the connected device is forwarded to the video relay service 26 and multicast by the video relay service 26 to each of the sets of visitors. Alternatively, the agent 14 may select a separate video feed from multiple connected devices 22 to be sent individually to sets of visitors 12.

Video Relay Service

In some embodiments, fragmented FMP4/H.26x video 79 from the video capture software 46 and WebM/H.26x video 59 from the browser 48 is forwarded by the video relay service 26 to the visitor computer 12. Video relay service 26 may be implemented using co-browse service 20 or may be separately implemented on the communication network 16. In some embodiments, video relay service 26 does not buffer the fragmented FMP4 video or the WebM video to minimize latency associated with forwarding the video to the visitor computer 12. Since video relay service 26 is responsible for forwarding copies of the video, but does not decode/re-encode the video, it is possible for the video relay service 26 to handle multiple video sessions 33 simultaneously without encountering scaling problems. This also allows the computationally complex operations associated with encoding and decoding to take place in a distributed manner, by concentrating these functions on the edge of the communication network 16, such as at agent computer 14, rather than in the center of the network cloud.

In some embodiments, the video relay service 26 is also configured to forward copies of the video to multiple visitor computers 12, for example where the agent 14 is communicating with multiple visitors 12 on the same live video session 33. Where more than one visitor computer 12 is connected to the live video session 33, the video relay service 26 enables access to the video being transmitted on the video session 33 to each of the visitor computers 12 by relaying a copy of the video to each of the visitor computers 12 participating on the live video session 33.

In an embodiment where more than one visitor computer 12 is connected to the live video session 33 and codec 62 encodes video using a Scalable Video Coding profile, the video relay service 26 can extract and send lower quality bitstreams of video to visitors 12 that cannot consume the full high-quality bitstream. SVC allows video relay service 26 to provide these various quality bitstreams without expending CPU cycles transcoding the video and without incurring the additional latency a transcoding step would impose.

Visitor Browser

Figure 7:
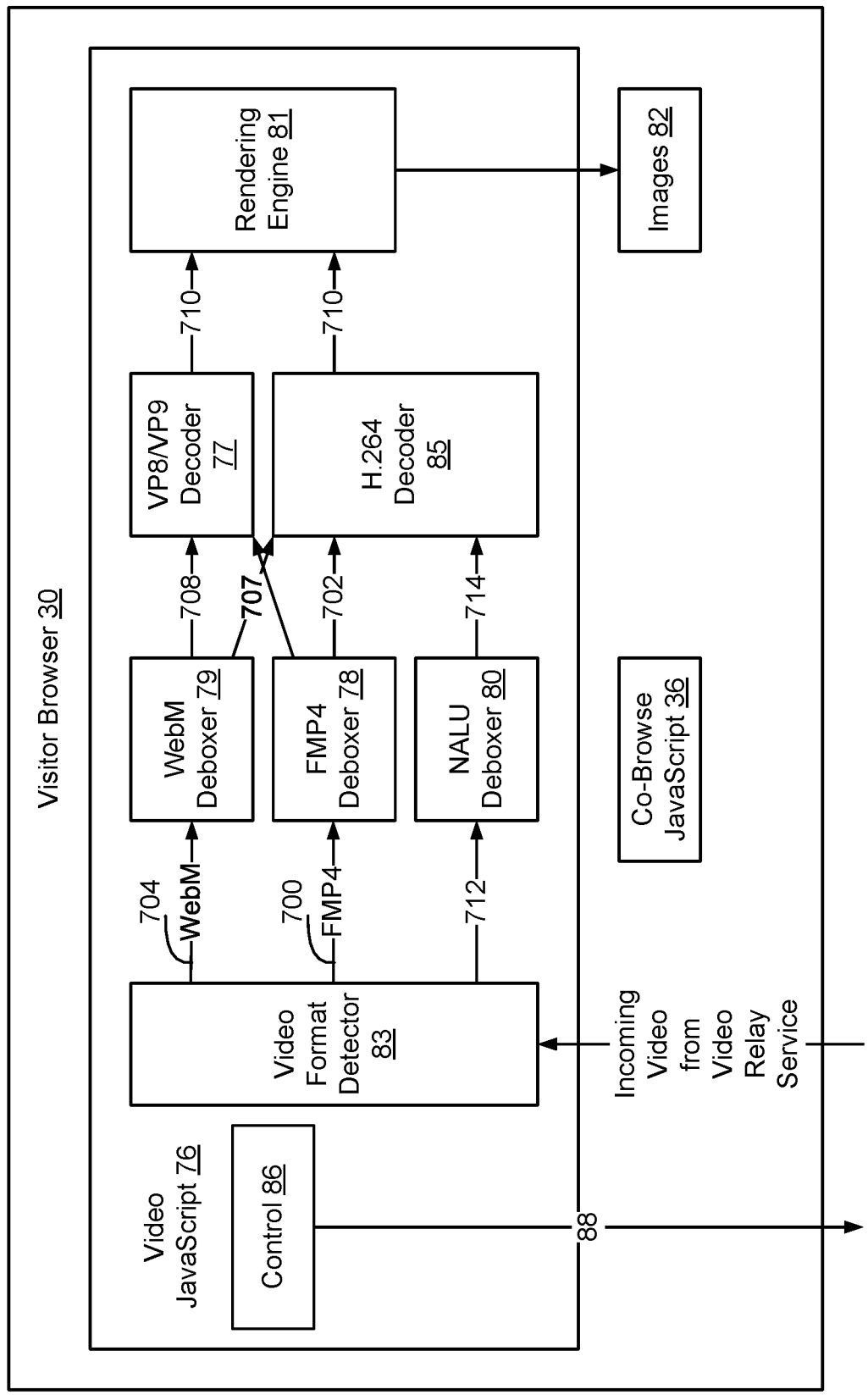
FIG. 7 is a functional block diagram of a visitor browser, according to some embodiments.

FIG. 7 shows an example visitor browser 30. As shown in FIG. 7, in some embodiments the when the visitor browser 30 loads a webpage 19 from website 18 (see FIG. 1), co-browse JavaScript 36 is loaded to the visitor browser 30. Co-browse JavaScript 36 is configured to capture the DOM of the visitor browser 30 and forward the DOM information via the co-browse service 20 to agent 14. Because the agent 14 has the visitor's DOM information, the agent is able to use the visitor's DOM information to recreate the content 32 of the visitor's browser 30 remotely. In some embodiments the visitor browser 30 also loads video JavaScript 76 when the visitor loads the webpage 19 from website 18. The video JavaScript 76 may be loaded from the website 18, from the video relay service 26, from the co-browse service 20, or from another location on communication network 16.

In some embodiments the video JavaScript 76 has a video format detector 83 that receives incoming video from the video relay service 26 and determines whether the incoming video bitstream is formatted as FMP4, WebM, or H.264 Network Abstraction Layer Units (NALUs). In some embodiments, this is done by inspecting the stream's Multipurpose Internet Mail Extensions (MIME) type. For example, if the MIME type is video/webm, the video format detector determines that the incoming video bitstream is formatted as WebM video. Likewise, if the MIME type is video/mp4, the video format detector determines that the incoming video bitstream is formatted as FMP4 video. A MIME type of video/H264 may be interpreted that the incoming video is H.264 encoded video contained in H.264 NALUs.

If the incoming video is encapsulated with FMP4, the format detector 83 of the video JavaScript 76 passes (arrow 700) the bitstream to a FMP4 deboxer 78. The FMP4 deboxer 78 extracts the encoded video (H.265, H.264, H.263, H.261, etc.) from the FMP4 containers and passes the encoded video to a video decoder (arrow 702). In the case where the video is encoded with H.264, the encoded video is sent to a H.264 video decoder 85 (as shown). Where the video is encoded using a format other than H.264, (e.g., another one of the H.26x formats or perhaps a future version of VP8 or VP9, etc.), the H.264 decoder shown in FIG. 7 would be substituted by a corresponding decoder configured to decode video of that selected format. In some embodiments, where a H.264 decoder 85 is used to decode H.264 encoded video, the decoder 85 may be based on the Broadway.js H.264 decoder.

If the incoming bitstream is encapsulated with WebM, the video JavaScript 76 passes (arrow 704) the video to a WebM deboxer 79. The WebM deboxer 79 extracts the encoded video (H.265, H.264, H.263, H.261, etc.) from the WebM container and passes the encoded video to a video decoder. In the case where the encoded video is H.264 encoded video, the encoded video is sent to the H.264 video decoder 85 (arrow 707). Where the video is encoded using a format other than H.264, (e.g. another one of the H.26x formats or VP8, VP9, etc.), the H.264 decoder 77 shown in FIG. 7 would be substituted by a corresponding decoder configured to decode video of that selected format. For example, if the video is encoded using VP8 or VP9, the video is forwarded to VP8/VP9 video decoder 77 (arrow 708).

In the case where the bitstream contains H.264 NALUs, the encoded video is sent directly to H.264 deboxer 80 (arrow 712). The deboxed H.264 bitstream is then passed to decoder 85 (arrow 714) to be decoded.

Decoded video from video decoder 77 and/or video decoder 85 is passed to rendering engine 81 which outputs images 82 for display in visitor browser 30. The images 82 may be displayed in visitor browser 30 directly, in a separate browser window, or in a separate browser tab.

In some embodiments the WebM deboxer 79, FMP4 deboxer 78, H.264 deboxer, VP9 video decoder 77, H.26x video decoder 85, and rendering engine 81 are all implemented directly in browser 30, either by code native to browser 30 or by video JavaScript 76. In other embodiments, portions of the decoding may be implemented by components of visitor computer 12 external to browser 30, such as by an external decoder accessible via the operating system of visitor computer 12.

Control

In some embodiments, video JavaScript 76 at visitor computer 12 implements a control process 86 that generates and transmits control signals 88. Specifically, as shown in FIG. 2, in some embodiments transmission of control signals 88 enables the visitor computer 12 to instruct the video relay service 26 to slow down transmission of the encoded video or to speed up transmission of the encoded video to adjust the quality and latency of the live video transmitted by the agent on the live video session 33.

Specifically, in some embodiments, the visitor computer 12 sends control signals 88 to adapt the complexity of the incoming video according to its network or processing capability. The video relay service 26 forwards control signals 88 to agent computer 14 which uses data encoded in control signals 88 to adjust the bit rate, frame rate, resolution, or other parameters of the encoded video output by native codec 62. In some embodiments, the control channel is implemented via WebSocket Secure, which is layered on top of TCP/IP to provide a two-way control channel between the agent and visitor computers.

A video feed may be conceptualized as a sequence of still images that are transmitted and displayed at a sufficiently high frequency (i.e. at least 10 frames per second) to make the images appear to move smoothly. In some embodiments, to minimize the amount of bandwidth consumed by transmission of the video, an initial I-frame (intra-coded picture) is first transmitted and then only changes to the I-frame are transmitted in subsequent P-frames (forward predicted pictures). Most embodiments would not use B-frames (bi-directional predicted pictures), as they would increase latency. An I-frame is a complete image that does not require other frames to be decoded. P-frames and B-frames hold only part of the image information, the portion need to describe changes between frames, and accordingly need fewer bits to transmit than an I-frame. The use of I-frames, P-frames, and B-frames to encode video content is well known and, accordingly, a detailed description of video encoding is not required for a person of ordinary skill in the art to fully understand operation of the embodiments described herein.

During periods of network congestion, or when the visitor computer 12 lacks sufficient CPU resources to decode and render the video in a timely fashion, the video rate control process 86 of video JavaScript 76 forwards control signals 88 to instruct the agent 14 to reduce the frame rate, resolution, and/or bit rate of the H.26x. By reducing the frame rate, resolution, and/or bit rate of the video, the bandwidth or CPU required to transmit, decode and render the video is reduced, Once network conditions have improved or when more CPU frees up in visitor computer 12, the video rate control process 86 uses data encoded in control signals 88 to instruct the agent 14 to increase the frame rate, resolution, and/or bit rate of the encoded video. In some embodiments the native codec 62 at the agent computer 14 adjusts the actual manner in which the H.264 video is encoded, for example by adjusting the number of P-frames between I-frames. In other embodiments the manner in which the native codec encodes the video doesn't change, but the encoded video is repackaged at the agent computer 14 in a different format (different resolution and bitrate) for transmission to the visitor computer 12.

In some embodiments, rather than having explicit control signals generated and transmitted by control 86, network congestion or lack of CPU resources at visitor 12 is detected by having the video encoder add timestamps and byte counts to each package of encoded video in the transmitted bit stream. The control process 86 at the visitor browser, in this embodiment, acknowledges ("acks") back to the server at the video relay service 26 that is handling the video, the time that the viewer 12 decodes and/or renders the images contained encoded video package. This lets the video relay service 26 monitor how far behind a viewer 12 might be rendering a frame. It also lets video relay service 26 determine an approximation of how many bytes are stuck in the viewer's buffers or other transmission path buffers. Both of those parameters enable the server at the video relay service to generate and send control signals to the video encoder at the agent 14 to either back off or speed up.

In some embodiments, the video encoder at the agent 14 implements an encoding policy, which specifies an ordered list of resolution, frame rate and target bitrate. Each congestion event causes the server at the video relay service 26 to message the video encoder at the agent 14 to drop down the list one step. Each "no more congestion" event causes the video encoder at the agent 14 to ratchet back up the list. In this manner, the video relay service 26 is able to detect network congestion and/or delays at the visitor computer 12 due to lack of CPU, and use these factors to signal the agent 14 to adjust the output of the encoder accordingly.

Similarly, in some embodiments the relay service is configured to acknowledge receipt of each package of encoded data to the agent. This enables the agent to locally determine latency associated with transmission of the package of data on the network between the agent and relay service, and/or possible delays at the relay service. Using this latency determination, the agent encoder natively adjusts the manner in which the video is encoded to drop down the list specified in the encoding policy or ratchet back up the list specified in the encoding policy to reduce or increase the bitrate associated with the encoded video.

Figure 8:
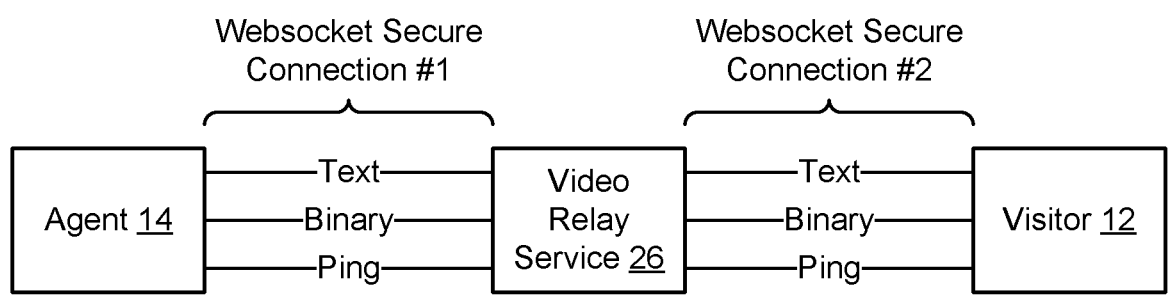
FIG. 8 is a functional block diagram of a control system in which transmission of low latency video and control information is implemented using websocket secure connections.

FIG. 8 shows some embodiments, in which transmission of low latency video and control information is implemented using websocket secure connections. As shown in FIG. 8, a websocket secure connection has three channels—a text channel, a binary channel, and a ping channel. In some embodiments, the binary channel of websocket secure connection #1 is used to transmit video from the agent 14 to the video relay service. The text channel of websocket secure connection #1 is used to pass instructions from the video relay service 26 to the agent 14 to explicitly instruct the agent 14 to change the encoding method in use to generate the video. The ping channel of websocket secure connection #1 is used to acknowledge receipt of the video containers, and includes for example the time of day the container was received, the content of the container, i.e. the video frame that was in the container, and the byte count of the container. As noted above, the acknowledgments enable the agent 14 to determine that latency is increasing/decreasing, to enable the agent 14 to self-adjust the manner in which the encoder is operating to reduce latency in the transmitted video.

In some embodiments, when the websocket secure connection #1 is signaled, as part of the signaling process the type of computer in use at the agent 14 will be identified to the video relay service 26. The video relay service provides to the agent 14 the encoder policy to be used by the agent 14 to encode video, including which resolutions, frame rates, and bitrates, should be used by the agent 14. The agent 14 uses one of the identified resolution/frame rate/bitrate as initial settings for the encoder. If latency is encountered using those settings, either the agent will detect the latency from the ping channel or the video relay service will signal the latency on the text channel. In response, the agent 14 will switch to a lower setting in which the resolution is somewhat lower, the frame rate is somewhat lower, or the bitrate is somewhat lower. The particular parameters of the lower settings are specified in the encoder policy provided by the video relay service 26. In operation, the agent may be provided with a policy that contains a finite number (e.g. 6 or 7) of sets of encoder parameters that are selectively used by the agent encoder during the duration of the live video session 33.

As shown in FIG. 8, the same type of websocket secure connection #2 is implemented between the visitor relay service 26 and the visitor 12. Like the websocket secure connection #1, the websocket secure connection #2 has three channels—a text channel, a binary channel, and a ping channel. In some embodiments, the binary channel of websocket secure connection #2 is used to transmit video from the video relay service 26 to the visitor 12. The text channel of websocket secure connection #2 is used to pass instructions from the visitor 12 to the video relay service 26 to explicitly instruct the video relay service to instruct the agent 14 to change the encoding method in use to generate the video. In FIG. 7, arrow 88 represents the text channel of websocket secure connection #2. The ping channel of websocket secure connection #2 is used to acknowledge receipt of the video containers, and includes for example the time of day the container was received/processed, the content of the container, i.e. the video frame that was in the container, and the byte count of the container. As noted above, the acknowledgments enable the video relay service 26 to determine that latency is increasing/decreasing at the visitor 12, to enable the video relay service 26 to instruct the agent 14 to adjust the manner in which the encoder is operating to reduce latency in the transmitted video.

An I-Frame typically requires 10× or more bandwidth than a P-Frame. By transmitting an I-Frame only when a new visitor joins the live video session 33 or otherwise as needed, bandwidth can be minimized. As noted, it is possible for two or more visitor computers 12 to receive low latency video on the live video session 33. If the video has already started to be transmitted from the agent to the first visitor, when a new visitor computer 12 joins, in some embodiments a new I-Frame is transmitted to all participants that are configured at the video relay service 26 to receive the video. By transmitting the new I-Frame to all participants (both the previous participants and the new participant), it is possible to display consistent video to each of the participants.

The agent computer 14 sends only one video stream, avoiding the need to maintain state information about which visitor received which video segment. Likewise, the video relay service 26 is not required to maintain state about which segments have been forwarded to which visitor computer 12, but rather the video relay service 26 is simply allowed to start forwarding the same video to all visitor computers 12. Additionally, the video relay service 26 does not need to transcode video from the agent computer 14 into streams for each visitor computer 12, which would be CPU-intensive for the video relay service 26. Control messages 86 from the various visitors 12 are rationalized by video relay service 26 to ensure all visitors 12 always have sufficient resources (CPU and bandwidth) to render in a timely fashion the single video stream all of them must consume.

Although an example was provided in which the browser 34 at the agent computer 14 was a browser based on, for example, the technology of Webkit, Chromium, or Safari, other browsers capable of outputting live video may likewise be used. For example, as browsers continue to evolve and develop, it may be that browsers from other companies gain the ability to output live video. The agent browser 34, accordingly, may use any browser that is equipped to output live video of this nature.

The methods and systems may be implemented in one or more computer programs, where a computer program may be understood to include one or more processor executable instructions. The computer program(s) may execute on one or more programmable processors, and may be stored on one or more non-transitory tangible computer-readable storage mediums readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), cache, optical or magnetic disk, CD, DVD, internal or external hard drive, memory stick, network-attached storage, storage in a networking "cloud" service, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The implementation of the program may be stored in object form native to the computer, in asm.js form, or in WebAssembly form. The language may be compiled, interpreted, or may be the subject of just-in-time compiling services provided by computer systems and/or browsers.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

What is claimed is:

1. A non-transitory tangible computer readable storage medium having stored thereon a computer program for implementing a method of implementing low latency live video on a communication session, the computer program comprising:
   a first set of instructions configured to enable a computer to load video processing JavaScript into a browser, the video processing JavaScript being configured to receive video from a video source connected to the computer, encode images of the video source into a H.26x encoded video format, package the encoded video into WebM format, and output the WebM/encoded video on a communication network;
   wherein the video processing JavaScript has two independent asynchronous data handlers:
   a first of the two independent asynchronous data handlers being configured to implement the step of encoding the received video from the video source; and
   a second of the two independent asynchronous data handlers being configured to implement the steps of packaging the encoded video into WebM format, and outputting the WebM/encoded video on the communication network.

2. The non-transitory tangible computer readable storage medium of claim 1, wherein the H.26x encoded video format is one of H.264 and H.265.

3. The non-transitory tangible computer readable storage medium of claim 1, wherein the video processing JavaScript is configured to package the encoded video into WebM containers.

4. The non-transitory tangible computer readable storage medium of claim 3, wherein the WebM containers are sized to fit within a single packet having a payload of 1500 bytes or less for transmission on the communication network.

5. The non-transitory tangible computer readable storage medium of claim 1, wherein the first of the two independent asynchronous data handlers is configured to pass the received video from the video source to a native codec of the computer for encoding, and receive the encoded video from the native codec.

6. The non-transitory tangible computer readable storage medium of claim 5, wherein the first of the two independent asynchronous data handlers passes the encoded data received from the native codec to the second of the two independent asynchronous data handlers without buffering the encoded data received from the native codec.

7. The non-transitory tangible computer readable storage medium of claim 5, wherein the first of the two independent asynchronous data handlers buffers the encoded data received from the native codec until a first predetermined amount of encoded data has been received from the native codec, and then passes the buffered encoded data to the second of the two independent asynchronous data handlers.

8. The non-transitory tangible computer readable storage medium of claim 1, further comprising a second set of instructions configured to receive control signals from a recipient of the WebM/encoded video, and use the control signals to adjust a frame rate, resolution, frame size, and/or bit rate of the WebM/encoded video.

9. The non-transitory tangible computer readable storage medium of claim 1, further comprising a second set of instructions configured implement a websocket secure connection to a video relay service, a binary channel of the websocket secure connection being used to transmit the WebM/encoded video, a text channel of the websocket secure connection being used to receive control messages related to encoding of the encoded video, and a ping channel being used to receive acknowledgments of containers of encoded video.

10. The non-transitory tangible computer readable storage medium of claim 1, further comprising a second set of instructions configured to enable the computer to load video capture software at the computer, the video capture software being configured to receive captured screen video from an external device connected to the computer, encode images of the captured screen video into the first H.26x video format, package the encoded captured screen video into Fragmented MP4 (FMP4) format, and output the FMP4/encoded video on a communication network.

11. The non-transitory tangible computer readable storage medium of claim 10, wherein the H.26x encoded video format is one of H.264 and H.265.

12. The non-transitory tangible computer readable storage medium of claim 10, wherein the video capture software is configured to package the encoded captured screen video into FMP4 mdat containers.

13. The non-transitory tangible computer readable storage medium of claim 12, wherein the FMP4 mdat containers are sized to fit within a single packet having a payload of 1500 bytes or less for transmission on the communication network.

14. The non-transitory tangible computer readable storage medium of claim 10, further comprising a third set of instructions configured to receive control signals from a recipient of the FMP4/encoded video, and use the control signals to adjust a frame rate, resolution, frame size, and/or bit rate of the FMP4/encoded video.

15. The non-transitory tangible computer readable storage medium of claim 14, wherein the first set of instructions is further configured to insert a timestamp and a byte count into containers of FMP4/encoded video, and the control signals are acknowledgments of the containers of FMP4 encoded video.

16. The non-transitory tangible computer readable storage medium of claim 10, further comprising a third set of instructions configured implement a websocket secure connection to a video relay service, a binary channel of the websocket secure connection being used to transmit the WebM/encoded video, a text channel of the websocket secure connection being used to receive control messages related to encoding of the encoded video, and a ping channel being used to receive acknowledgments of containers of encoded video.

17. A non-transitory tangible computer readable storage medium having stored thereon a computer program for implementing a method of implementing low latency live video on a communication session, the computer program comprising:
a first set of instructions configured to enable the computer to load video capture software at the computer, the video capture software being configured to receive captured screen video from an external device connected to the computer, encode images of the captured screen video into the first H.26x video format, package the encoded captured screen video into Fragmented MP4 (FMP4) format, and output the FMP4/encoded video on a communication network;
wherein the video capture software has two independent asynchronous data handlers:
a first of the two independent asynchronous data handlers being configured to implement the steps of receiving captured screen video from the external device connected to the computer, and encoding images of the captured screen video into the H.26x encoded video format; and a second of the two independent asynchronous data handlers being configured to implement the steps of packaging the encoded images of the captured screen video into FMP4 format, and outputting the FMP4/encoded video on the communication network.

18. The non-transitory tangible computer readable storage medium of claim 17, wherein the first of the two independent asynchronous data handlers is configured to pass the received captured screen video to a native codec of the computer for encoding and receive the encoded video from the native codec.

19. The non-transitory tangible computer readable storage medium of claim 18, wherein the first of the two independent asynchronous data handlers passes the encoded data received from the native codec to the second of the two independent asynchronous data handlers without buffering the encoded data received from the native codec.

20. The non-transitory tangible computer readable storage medium of claim 18, wherein the first of the two independent asynchronous data handlers buffers the encoded data received from the native codec until a first predetermined amount of encoded data has been received from the native codec, and then passes the buffered encoded data to the second of the two independent asynchronous data handlers.

21. A non-transitory tangible computer readable storage medium having stored thereon a computer program for implementing a method of implementing low latency live video on a communication session, the computer program comprising:
a set of instructions configured to implement video JavaScript in a browser, the video JavaScript comprising a video format detector, a WebM deboxer, a FMP4 deboxer, a video decoder, and a rendering engine;
wherein the video format detector is configured to determine if a bitstream received by the video JavaScript contains video packaged in FMP4 or WebM;
wherein if the video format detector determines that the bitstream contains WebM containers, the format detector passes the bitstream to the WebM deboxer, and if the video format detector determines that the bitstream contains FMP4 containers, the format detector passes the bitstream to the FMP4 deboxer.

22. The non-transitory tangible computer readable storage medium of claim 21, wherein the video format detector is configured to determine a Multipurpose Internet Mail Extensions (MIME) type of the containers and use the MIME type to direct the bitstream to the WebM deboxer or to the FMP4 deboxer.

23. The non-transitory tangible computer readable storage medium of claim 21, wherein the JavaScript further comprises a NALU deboxer and wherein the video format detector is configured to determine if the bitstream received by the video JavaScript contains H.264 Network Abstraction Layer Units (NALUs), and if the bitstream contains H.264 NALUs, to direct the bitstream to the NALU deboxer.

24. The non-transitory tangible computer readable storage medium of claim 23, wherein the video decoder comprises a H.26x decoder configured to perform H.26x video decoding of encoded video.

25. The non-transitory tangible computer readable storage medium of claim 24, wherein the H.26x decoder is configured to decode video that was encoded using H.264 or H.265.

26. The non-transitory tangible computer readable storage medium of claim 24, wherein the rendering engine is configured to render images from decoded video output from the H.26x decoder.

27. The non-transitory tangible computer readable storage medium of claim 21, wherein the set of instructions is further configured to implement a control process to indicate a state of the decoder or rendering engine.

28. The non-transitory tangible computer readable storage medium of claim 27, wherein the control process is configured to acknowledge when processing of a containers of encoded data has been completed by the decoder or rendering engine.

29. A system for controlling transmission of encoded video, comprising:
a video sender computer including a first set of instructions configured to enable the computer to load video processing JavaScript into a browser, the video processing JavaScript being configured to receive video from a video source, encode images of the received video into a H.26x encoded video format, package the encoded video into WebM containers or H.26x containers, and output the WebM/encoded video or FMP4/encoded video on a communication network, the first set of instructions being further configured to insert a timestamp and a byte count into each container of video transmitted on the communication network;
a video relay service computer including a second set of instructions configured to send first acknowledgements to the video sender computer in connection with each container of video received from the video sender computer and forward each container of video on the communication network; and
a video receiver computer including a third set of instructions configured to send second acknowledgments to the video relay service computer in connection with each container of video received from the video relay service computer;
wherein the first set of instructions is configured to determine latency from the first acknowledgments and use the determined latency to adjust a manner in which the images are encoded; and
wherein the second set of instructions is configured to determine latency from the second acknowledgments and transmit control signals to the video sender to adjust the manner in which the images are encoded;
wherein the video processing JavaScript has two independent asynchronous data handlers:
a first of the two independent asynchronous data handlers being configured to implement the step of encoding the received video from the video source; and
a second of the two independent asynchronous data handlers being configured to implement the steps of packaging the encoded video into WebM containers or FMP4 containers, and outputting the WebM/encoded video or FMP4/encoded video on the communication network.

30. The system of claim 29, further comprising a first websocket secure connection between the video sender computer and the video relay service computer, a binary channel of the first websocket secure connection being used to transmit the WebM/encoded video or the FMP4/encoded video from the video sender computer to the video relay service computer, a text channel of the websocket secure connection being used to transmit control messages by the video relay service computer to the video sender computer related to how the video sender computer should encode future containers of encoded video, and a ping channel being used to transmit acknowledgments of containers of encoded video from the video relay service computer to the video sender computer.

31. The system of claim 29, further comprising a second websocket secure connection between the video receiver computer and the video relay service computer, a binary channel of the second websocket secure connection being used to transmit the WebM/encoded video or the FMP4/encoded video from the video relay service computer to the video receiver computer, a text channel of the websocket secure connection being used to transmit control messages by the video receiver computer to the video relay service computer related to how the video sender computer should encode future containers of encoded video, and a ping channel being used to transmit acknowledgments of containers of encoded video from the video receiver computer to the video relay service computer.

\* \* \* \* \*